Feb. 6, 1951 R. F. ZIMPEL 2,540,181
MACHINE FOR HANDLING GLASS JARS
Filed Sept. 10, 1946
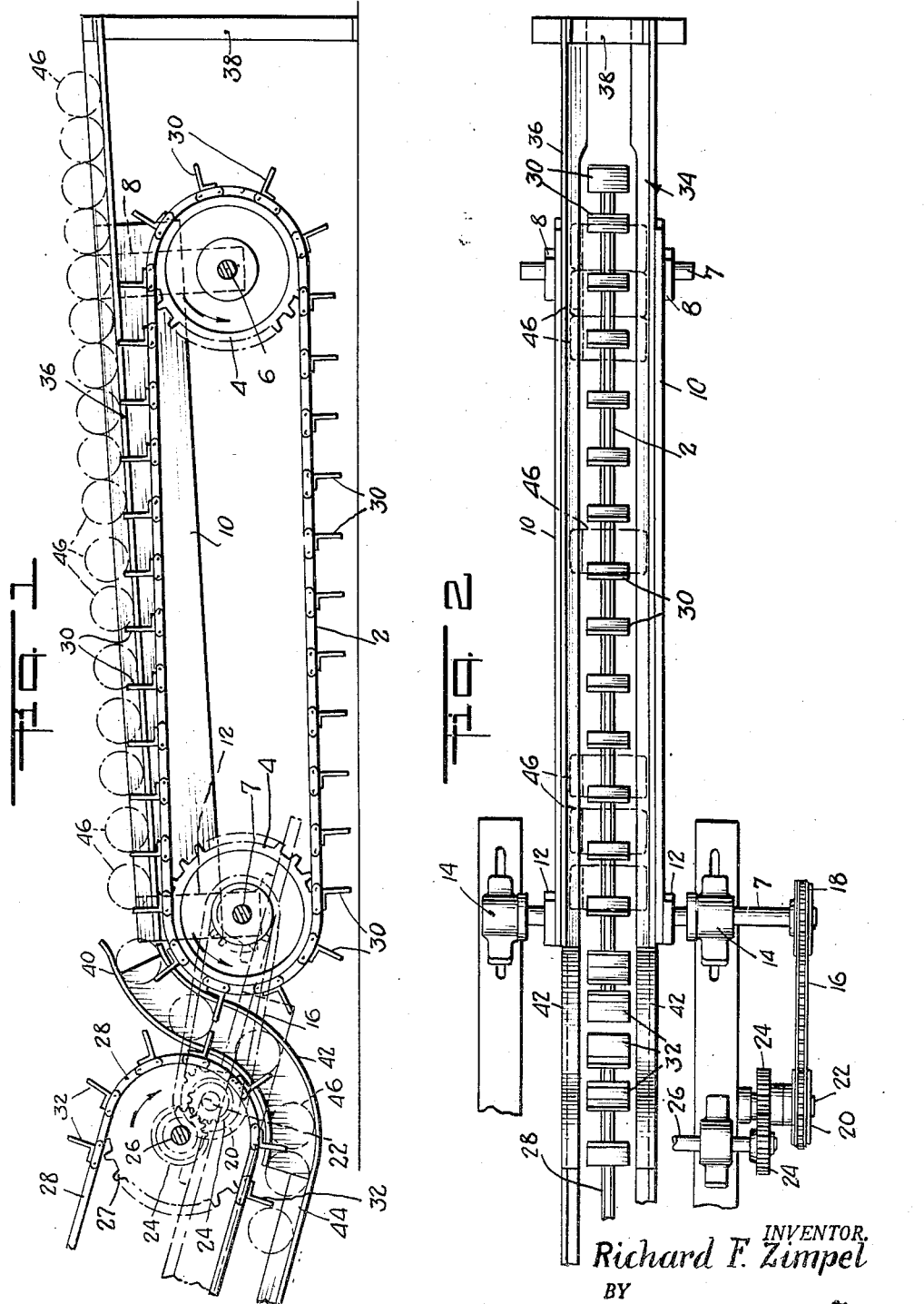
INVENTOR.
Richard F. Zimpel
BY
ATTORNEYS Patented Feb. 6, 1951

2,540,181

UNITED STATES PATENT OFFICE 2,540,181

MACHINE FOR HANDLING GLASS JARS

Richard F. Zimpel, Canajoharie, N. Y., assignor to Beech-Nut Packing Company, Canajoharie, N. Y., a corporation of New York Application September 10, 1946, Serial No. 695,872

2 Claims. (Cl. 198—23)

The present invention relates to machines for handling cylindrical articles, and has special reference to machines for use in conveying glass jars from retort baskets into a mechanical dryer for removing moisture prior to labeling.

One of the objects of the invention is to provide a machine which is particularly adapted for thus handling glass jars, in which the jars are conveyed from a point in proximity to the retort baskets and into the dryer with no appreciable change in velocity or sudden changes in direction, or otherwise subjected to shock that would be liable to cause chipping of the glass.

Another of the objects of the present invention is to provide a novel and improved machine for handling glass jars and other cylindrical articles.

The several features of the invention, whereby these and other objects may be attained, will be readily understood from the following description and accompanying drawings, in which:

Figure 1 is a longitudinal sectional elevation, partly diagrammatical, of a machine embodying the features of the invention in their preferred form;

Figure 2 is a plan view of the same.

The machine illustrated in the drawings is provided with an endless conveyor 2 which may be in the form of a belt or sprocket chain which passes over sprocket wheels 4 that are mounted on shafts 6 and 7. The shaft 6 has its ends journaled in the lower ends of hangers 8 secured to side frames 10. The rear sprocket shaft 7 extends through bearings in hangers 12 secured to the side frames 10, and is journaled in supporting bearings in supports 14.

The conveyor is driven through a belt or sprocket chain 16 which passes over a sprocket wheel 18 secured on one end of its rear shaft 7, and a sprocket wheel 20 secured on a shaft 22 which is driven through gears 24 by a shaft 26. The shaft 26 carries the front sprocket wheel 27 of an endless conveyor 28 that may extend through the jar dryer (not shown).

The conveyor 2 is provided with outwardly projecting flights 30 which are equally spaced apart, each flight comprising an angle iron secured transversely to the conveyor.

The conveyor 28 is provided with outwardly projecting flights 32 corresponding to and equally spaced as in the case of the flights 30.

The two conveyors are driven at the same speed so as to successively position the flights thereof opposite each other and in close proximity.

The machine is further provided with a chute 34 which extends over the upper stretch of the conveyor 2 and is inclined downwardly and rearwardly. This chute is made up of longitudinally extending angle irons or flanged rails 36 which are spaced apart and secured to the side frames 10. Such spacing of the rails provides a clearance slot so as to permit the flights of the upper stretch of the conveyor 2 to pass through the slot.

The side frames 10 which carry the forward shaft and sprocket wheel of the conveyor 2 and on which the chute 34 is mounted, are supported by means of a standard 38 secured to the rear ends of the chute rails 36. By raising and lowering this standard, it will be apparent that the conveyor 2 and chute 34 may be swung about the axis of the rear shaft 7 and thus vary the inclination of the chute and conveyor.

The rear end of the chute 34 opens into the front end of an S-shaped chute or guide 40 which is made up of spaced channel irons 42, and extends beneath the front sprocket wheel of the conveyor 28. The rear end of this S-shaped chute or guide 40 leads between flanged rails 44.

With this construction, the jars 46 from the retort baskets may be placed by hand transversely upon the front end portion of the chute 34, whereupon the jars roll down the chute one against the other as indicated in the drawings. As the flights 30 of the conveyor 2 pass along the upper stretch of the conveyor 2, they gradually enter the inclined chute through the longitudinal clearance slot therein, and into engagement with the row of jars rolling down the chute. The speed of the conveyor 2 is substantially the same as the speed of travel of the jars as they roll down the chute, and the flights 30 thereof are properly spaced as shown so as to gradually work into position to be engaged by the rear sides of the jars and thus cause the jars to be segregated thereby with practically no shock or change in velocity. The rate of travel of the jars down the chute may be easily varied to conform with the speed of the conveyor 2, by varying the height of the support 38 to vary the inclination of the chute, this being effected without varying the relative positions of the chute and the conveyor.

As the jars pass from the rear end of the chute 34 they successively enter the S-shaped chute or guide 40, and are supported by the flights 30 until each flight is positioned opposite the corresponding flight 32 of the conveyor 28. During the further travel of each jar the flight 30 on which it was supported, passes from beneath the jar and the jar is then supported by the corresponding flight 32 of the conveyor 28 when the jar reaches a position beneath the front end of the conveyor 28, it is supported on the flanges of the S-shaped guide 40, and then the succeeding flight conveys the jar along the rails 44 and through the mechanical dryer.

It will be apparent with this construction that from the time the jars are deposited on the forward end of the chute until they are conveyed by the flights 32 of the conveyor 28 through the dryer, the jars flow through the machine with no appreciable change in velocity or sudden changes of direction, or otherwise subjected to shock which would be likely to cause chipping of the glass.

As will be evident to those skilled in the art, my invention permits various modifications without departing from the spirit thereof or the scope of the appended claims.

What I claim is:

1. In a machine for handling jars and the like, a chute inclined downwardly and rearwardly down which jars transversely placed on the front end portion thereof are adapted to roll one behind the other, said chute having a longitudinally extending clearance slot therein, an endless conveyor having outwardly projecting transverse flights, the upper stretch of the conveyor being suitably arranged with relation to the chute and driven at a suitable speed with relation to the speed of the jars rolling down the chute, and the flights being suitably spaced apart, to cause the flights after they reach the upper stretch of the conveyor to successively enter and project through said clearance slot and to successively engage the rear sides of the jars and separate them as they approach the rear end of the chute, a second endless conveyor having the front end thereof in proximity to the rear end of the first-mentioned conveyor and having outwardly projecting transverse flights spaced apart longitudinally thereof, means for driving the two conveyors in timed relation so as to cause the flights thereof to successively be carried into alinement whereby the jars as they leave the end of said chute are conveyed by the flights of the first-mentioned conveyor into a position to successively engage the flights of the second-mentioned conveyor, and a chute leading from the rear end of the first-mentioned chute for guiding the jars as they pass from one conveyor to the other.

2. In a machine for handling jars and the like, a chute inclined downwardly and rearwardly down which the jars when transversely placed on the front end thereof are adapted to roll one behind the other, said chute having a longitudinally extending clearance slot therein, an endless conveyor having outwardly projecting transverse flights adapted to successively enter and project through said clearance slot to successively engage the rear sides of the jars and separate them as they approach the rear end of the chute, a second endless conveyor having the front end thereof in proximity to the rear end of the first-mentioned conveyor and having outwardly projecting transverse flights spaced apart longitudinally thereof, means for driving the two conveyors in timed relation in opposite directions so as to cause the flights thereof to be successively carried into alinement whereby the jars as they leave the rear end of said chute are conveyed by the flights of the first-mentioned conveyor into a position to successively engage the flights of the second-mentioned conveyor as they approach the lower stretch of the latter conveyor, and a chute leading from the rear end of the first-mentioned chute for guiding the jars as they pass from one conveyor to the other.

RICHARD F. ZIMPEL.

REFERENCES CITED

The following references are of record in the file of this patent:

UNITED STATES PATENTS

| Number | Name | Date |
|---|---|---|
| 1,209,801 | Beckett | Dec. 26, 1916 |
| 1,300,763 | Paridon | Apr. 15, 1919 |
| 1,399,039 | Wright | Dec. 6, 1921 |
| 1,928,199 | Donnelly | Sept. 26, 1933 |